United States Patent [19]

Johnsen

[11] Patent Number: 5,151,684
[45] Date of Patent: Sep. 29, 1992

[54] ELECTRONIC INVENTORY LABEL AND SECURITY APPARATUS

[76] Inventor: Edward L. Johnsen, 19 Bent Ave., Wayland, Mass. 01778

[21] Appl. No.: 684,574

[22] Filed: Apr. 12, 1991

[51] Int. Cl.[5] .............................................. G08B 13/14
[52] U.S. Cl. .................................. 340/572; 340/551; 340/568
[58] Field of Search ................... 340/551, 572, 825.35, 340/568

[56] References Cited

U.S. PATENT DOCUMENTS

| | | | |
|---|---|---|---|
| 4,000,488 | 12/1976 | Ephraim | 340/572 |
| 4,002,886 | 1/1977 | Sundelin | 340/825.35 |
| 4,299,040 | 11/1981 | Minasy | 40/662 |
| 4,336,531 | 6/1982 | Kincaid | 340/568 |
| 4,377,741 | 3/1983 | Brekka et al. | 235/472 |
| 4,418,411 | 11/1983 | Strietzel | 371/67.1 |
| 4,458,142 | 7/1984 | Bernstein | 340/825.35 |
| 4,471,344 | 9/1984 | Williams | 340/572 |
| 4,500,880 | 2/1985 | Gomersall et al. | 340/825.35 |
| 4,538,158 | 8/1985 | Warszawski | 346/135.1 |
| 4,596,635 | 6/1986 | Warszawski | 204/2 |
| 4,596,722 | 6/1986 | Warszawski | 427/108 |
| 4,652,863 | 3/1987 | Hultman | 340/551 |
| 4,656,463 | 4/1987 | Anders | 340/541 |
| 4,694,283 | 9/1987 | Reeb | 340/572 |
| 4,724,426 | 2/1988 | Lundberg | 340/551 |
| 4,754,563 | 7/1988 | Fast | 40/663 |
| 4,812,811 | 3/1989 | Asbrink et al. | 340/571 |
| 4,835,524 | 5/1989 | Lamond et al. | 340/572 |
| 4,870,391 | 9/1989 | Cooper | 340/551 |
| 4,881,061 | 11/1989 | Chambers | 340/572 |
| 4,920,335 | 4/1990 | Andrews | 340/572 |
| 4,939,861 | 7/1990 | Soubliere | 40/651 |
| 4,945,217 | 7/1990 | Bolan | 235/472 |
| 4,948,954 | 4/1990 | Dias | 235/441 |

FOREIGN PATENT DOCUMENTS

| | | | |
|---|---|---|---|
| 9005968 | 5/1990 | PCT Int'l Appl. | 340/572 |
| 2181326 | 4/1987 | United Kingdom | 340/572 |

OTHER PUBLICATIONS

IBM Technical Disclosure Bulletin, vol. 3, No. 7, Dec. 1990.
"When Theft is an Inside Job", James D. Walls, Apr. 1989.
"Electronic Shelf Labels: How they Stack Up", Warren Thayer, Progressive Grocer Jan., 1990.
"Electronic Price Labels Ready for Takeoff?", Mark Millstein, Supermarket News Jun., 1989.
"Datachecker Terminal System Electronic Shelf Price and Information Network", May 1988.
"The Debut of It's FR/ID Technology", Kevin R. Sharp, ID Systems Nov., 1990.
"A Two-Dimensional Symbology Perspective", Carl Helmers, ID Systems Oct., 1990.
"An RF/ID Primer", Dave Draxler, ID Systems Jun., 1990.
"FR/ID: Meeting Industry's Needs in Harsh Environments", Russ Adams, Automatic ID News Aug., 1990.
"Tagscan Electronic Identification and Inventory Control System", Nov., 1987.

*Primary Examiner*—Jin F. Ng
*Assistant Examiner*—Christine K. Oda
*Attorney, Agent, or Firm*—Robert M. Asher

[57] ABSTRACT

A self-contained, reusable, electronic security label device and system wherein a tag device is attached to merchandise for the purpose of security, surveillance, pricing, tracking, accounting and inventory control. The device includes a programmable display for identifying the merchandise and displaying a price. A connector attaches the device to a piece of merchandise and an alarm is sounded in the event a device is tampered with or damaged, or upon unauthorized removal of the connector. The alarm is disarmed and the connector is detached upon receipt of a signal indicating the merchandise has been sold. The system includes read/write apparatus to electronically program, read and monitor devices attached to merchandise.

35 Claims, 7 Drawing Sheets

ELECTRONIC INVENTORY LABEL AND SECURITY APPARATUS

BACKGROUND OF THE INVENTION

The present invention is a self-contained, reusable, electronic label device attached to merchandise for the purpose of security, surveillance, pricing, tracking, accounting and inventory control. The device is used to deter employee theft and shoplifting. Additional apparatus provides a management tool for updating labels, inventory and operations control.

In retailing merchandise to the general public, loss of merchandise through employee theft and shoplifting is sometimes referred to as "shrinkage". It is estimated by the United States Chamber of Commerce that internal losses due to employee theft in the United States amount to at least $40 billion annually. Shoplifting by consumers is estimated at $30 billion annually. These losses result in higher merchandise prices to the consumer and large expenditures for loss prevention by manufacturers, distributors and retailers alike.

There are many types of employee theft. Theft is accomplished through manipulation of paperwork, particularly when a non-computerized or a partially-computerized accounting system exists. Receiving reports get submitted to accounts payable for merchandise never received and checks are made payable to fictitious suppliers. Physical inventory counts get "lost" and result in shortages. Merchandise pricing gets "reduced" at the point of sale for friends. Several "not paid for items" get included in a "friend's" bag of purchases. Employees locking up at night after the store closes take home merchandise after the exit alarm detectors are off, or they go through non-alarmed doors. Organized scams between retail employees and merchandise suppliers operate unchecked. Stolen merchandise gets "returned", with or without a sales slip, regardless of whether the merchandise even matches the sales slip. Merchandise is put into trash and picked up outside the store in the dumpster that night. Clerks can underring a cash sale and pocket the difference. Refund slips can be created for consumers who do not really exist and the money pocketed. Merchandise can be purposely damaged to be purchased at a discount. Kickbacks can be received from a supplier. Two checks can be written for one invoice and the duplicate amount split between employees at both ends. The list is endless and opportunities go on and on.

Retailers attempt to deter theft in a number of ways. Inventory control systems are used to detect shrinkage, but this is always after the fact. Security guards may be used at employee entrances and security staff roam the selling areas looking for theft. Magnetic devices are attached to expensive garments which sound an alarm if taken through a magnetic detection field at the consumer's exit. However, an employee could remove the magnetic device at the point of sale without a purchase of the item because the release mechanism is not integrated with the cash register system. Magnetic labels are pasted to merchandise which will also set off the alarm at an exit, if they have not been peeled off. These too can be deactivated at the cash register without purchasing the merchandise.

Closed circuit video cameras have been installed in warehouses and selling areas to monitor employees as well as consumers. One security person may be expected to watch as many as ten screens. The closed circuit cameras are not in the dressing rooms where a shoplifter may wear a garment under others to steal it. Other retailers put heavy metal wires through the sleeves of expensive garments and attach the wire to an audible alarm or to a stationary pole so the garment cannot be removed. How does a person try on the garment? A sales clerk must release it. Therefore, a sales clerk may release it to a friend who wears it home. Wires through sleeves attached to poles or alarms are quite inconvenient for the consumer, perhaps even acting as a deterrent to purchasing the merchandise in that store.

Retailers divide accounting functions among their employees to attempt to prevent theft. Therefore, in theory, one person is not able to circumvent the system. This is often expensive and cost prohibitive. Surveillance, security checkpoints, physical controls such as magnetic tags and additional employees to watch each other add up to higher costs for retailers and result in higher prices to consumers.

Present methods of applying price labels to merchandise are costly and prone to error. Merchandise placed on the selling floor is labeled in a variety of ways, among them stick-on pressure sensitive labels and hang tags. Many of these labels are machine readable and the price lookup table in the cash register must match the price tags. Mistakes are often made and merchandise is sold at the wrong price. When a label is machine read at the point of sale, a computer looks up the price for the merchandise and displays it. If the prices differ, the consumer can insist that he pay the lower price marked on the label.

Retailers often have sales and mark down the price of merchandise. This may be done by applying a second label over the original label or by creating a new label or hang tag. Some retailers hand write the discounted price over the original price. The lookup table in the cash register system must also be updated with the current price. The initial cost of labeling items is labor-intensive, and the costs associated with marking down a price label incur additional costs. Many states have laws that require each piece of merchandise to have its own price label, thus shelf labels displaying the price of merchandise is redundant and contributes to additional costs for retailers. Computer driven shelf labels are disclosed in U.S. Pat. No. 4,002,886 (Sundelin) and U.S. Pat. No. 4,500,880 (Gomersall et al.). Present electronic merchandise display labels are only used to display prices on shelves, are not self-contained and are not used as intelligent security devices. Current attachable hang tags and labeling systems for merchandise are one-time use hang tags or labels, are not reusable, cannot be automatically changed to display new prices and are not intelligent security devices.

SUMMARY OF THE INVENTION

The present invention is a self-contained labeling, security, tracking and inventory control device for use in a merchandising system. The device of the present invention acts as a tag to identify a piece of merchandise. The tag device is provided with a mechanism for sounding an alarm if the device is removed from the piece of merchandise. The device contains communication means for receiving a "sold" signal which is issued after it has been read by a scanner when the merchandise is purchased. The alarm is deactivated in response to the sold signal, the device can be removed from the piece of merchandise and is reusable.

Merchandise identification and description can be displayed by the tag device. The device is provided with a microprocessor which programs the display panel and controls other functions within the device. The device is attached to a piece of merchandise by such means as a conductive loop. When the loop is broken or detached, communication ceases between the device and the surveillance system and causes an audible alarm to be sounded by the device and surveillance system. The programmable display panel of the present invention may have sufficient resolution to display a machine-readable bar code.

The tag device of the present invention may be further provided with wireless communication means in the form of an RF transmitter and RF receiver connected to an RF antenna. The communication capability permits flexible reprogramming of the tag device so as to change the price of an item and further permits constant surveillance of the merchandise to which it is attached. If a device is tampered with, damaged or disabled, the surveillance system immediately identifies the device when communications between them are interrupted or lost. Security personnel can then be directed to the location of the device which has been tampered with, damaged or disabled.

The device of the present invention can be advantageously used in a security system for protecting merchandise. Each device is given a unique identification code to specifically identify the piece of merchandise to which it is attached. Such unique identification codes are recorded in the master store computer system. Employees can each be given an identification card containing machine-readable codes. Access to devices can be restricted to employees who meet required authorization levels. Thus price changes, for example, can only be provided to the device by those who are authorized to do so. The alarm on the device can only be deactivated upon purchase of the merchandise. At time of purchase, the unique identification code is read from the device so that the master store computer system can record specific merchandise that has been purchased for inventory purposes. Furthermore, at the point of purchase the employee's number is read and recorded. The device and surveillance system are programmed such that their alarms cannot be deactivated until the master store computer system provides an indication that the merchandise has been properly purchased and identification of the employee registering the sale is made. Therefore, theft by employees is substantially reduced since the devices cannot be removed without identifying the employee doing so.

The various objects, advantages and novel features of the present invention will be more fully understood from a reading of the following detailed description in conjunction with the drawings.

DETAILED DESCRIPTION OF THE PREFERRED EMBODIMENTS

Figure 1:
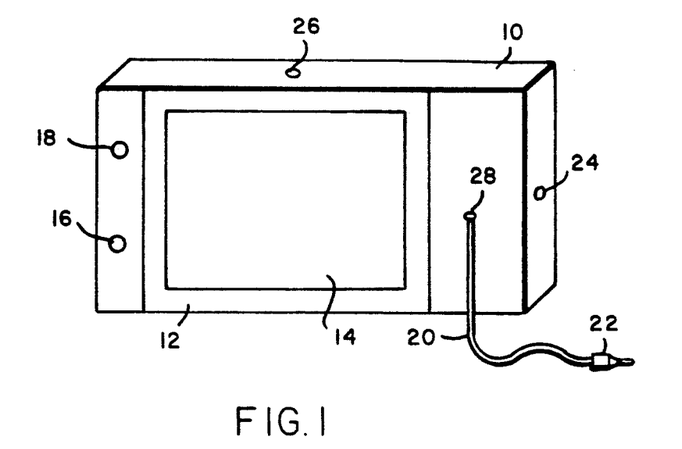
FIG. 1 is a front view of a tag device of the present invention.

Referring now to FIG. 1, a self-contained, reusable electronic label and security device 10 of the present invention is shown consisting of frame 12 which houses the electronic and mechanical components. The label and security device 10 is used as a tag which is attached to a piece of merchandise, so is referred to herein as a tag device. A display panel 14 is supported by frame 12 for viewing. A second display panel (not shown) may be supported on the rear side of the frame 12 as well so that information to be displayed is readily accessible on either side of the tag device 10. Alternatively, the two displays may be used to provide different images. For example, a machine-readable bar code may be displayed on one panel and a human-readable image displayed on the other. The display panels may be used to display the price for the piece of merchandise to which the tag device is attached, as well as provide a description of the merchandise. More particularly, each tag device attached to a piece of merchandise may be given a unique identification code to be stored within the memory of the tag device. Such unique identification code may be used to track the movement of the merchandise and pinpoint its location.

The programmable display panels normally have a white appearance in which graphic images and/or text are created through the transmission of energy to a matrix or pattern of conductors or the like inside the panel substrate which are of a contrasting color to the background. Display panels of this type are well known in the art. The display panels are preferably selected to have sufficient resolution to display a machine-readable bar code of the type used such as UPC, and has sufficient resolution so that a bar code scanner can accurately read the bar code from the display. Such a display panel is available for purchase under the trademark POLYVISION manufactured in the United States by The Alpine Group, Inc. of Hackensack, N.J.

An additional display feature is provided by using an LED 16 on the frame 12 of the tag device. The LED, for example, can be made to flash on and off to draw attention to a sale price. A manually-depressible button 18 may be provided to give a shopper the opportunity to press the button to change the display panel's image to obtain additional information about the merchandise.

Connector 20 is permanently secured at one end 28 to the tag device. The connector is used to attach the tag device to a piece of merchandise. The connector may be fed through a buttonhole or other opening in a product which cannot be broken open without harming the merchandise. The unsecured end of the connector 20 has a jack 22 for connection into a receptacle 24 in the side of the tag device. The connector 20 is a cord, band, link, fiber optic or wire or may be a combination of these materials which will conduct data, light and/or electricity. Connector 20 may also contain material which will allow it to be used as an aerial for wireless communication. Attachment of the jack 22 into the receptacle 24 completes a circuit. The jack 22 is securely clamped into the receptacle 24 and cannot be removed without releasing the clamp. In accordance with the present invention, the clamp releases the jack 22 only when the tag device receives a signal indicating that the piece of merchandise has been purchased. In some applications, a tag detacher device connected to a cash register system or other authorized system may also be employed to release disabled tag devices.

If the conductive loop formed by the connector 20 is broken, the broken circuit is detected by the tag device 10. The detection of a break in the circuit may be used to initiate an audible alarm from the tag device. The break also causes communications between the tag device 10 and surveillance system to cease. The surveillance system maintains communication with all such tag devices permitting the system to keep track of the location of each tag device. When communication ceases with a tag device, the surveillance system can signal the last known location of the tag device to security personnel.

Receptacle 26 is a port used to recharge the power source from an external source.

Figure 2:
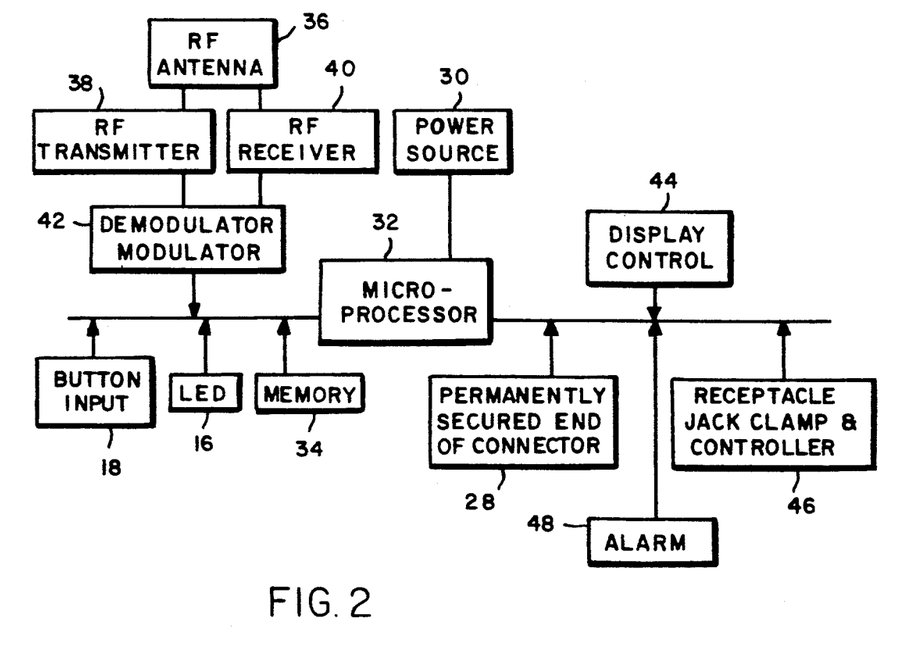
FIG. 2 is a schematic block diagram of the electronics in the tag device of the present invention.

FIG. 2 is a schematic block diagram of the inner components of the tag device 10. A power source 30, such as a rechargeable battery, supplies power for the components within the tag device. Control for the components in the tag device are provided by a microprocessor 32. The microprocessor operates in conjunction with a memory 34.

A radio frequency antenna 36, a radio frequency transmitter 38 and a radio frequency receiver 40 are within the tag device to provide the tag device with wireless communication capabilities. A suitable antenna, transmitter and receiver may be available on integrated circuit chips such as the microtransmitter B-chip developed by Martin Marietta and/or the Texas Instruments Registration and Identification System (TI-RIS). Data received over the RF antenna 36 can be processed by a demodulator/modulator 42 for use in the microprocessor 32. Likewise, when sending information from microprocessor 32, demodulator/modulator 42 may be used to put the information into the proper protocol for the RF transmitter 38. The RF equipment can be operated at one frequency for communicating with the read/write devices, another frequency to communicate with the surveillance systems and still another for communicating with the point-of-sale devices. Identification of the merchandise corresponding to the tag device can be transmitted through wireless communication and imaged on the programmable display 14 of the tag device. Once the merchandise has been purchased, a signal is sent from the point-of-sale cash register system to the read/write device and transmitted to the RF antenna 36 informing the tag device of the sale. RF antenna 36 may also be used in communication with the surveillance system to continually communicate with those systems to indicate that a tag device is operating and to assist in locating that tag device within a store. A failure to communicate would be identified by a surveillance system at which time security personnel could be immediately notified. The RF antenna 36 is also used to issue a relatively weak unique signal that is detectable only by store exit surveillance RF sensors at the doorways of a warehouse or a retail selling area. The signal is weak and of such a unique frequency that it is detectable only when the tag device is close to the exit sensors, such as when the tag device is being brought through the exit. Thus, a product which has an attached tag device of the present invention cannot be removed through any doors without the RF sensors picking up the signal. Detection of the signal would trigger an alarm to alert security personnel that the merchandise is being removed from the store without being purchased. Merchandise that is properly purchased will have its tag device removed and thus avoids such an alarming situation.

Tag devices attached to merchandise being transported from one place to another, such as from a warehouse to a retail store location, would have the transmission of the weak, unique signal deactivated as there would not be a surveillance system to monitor them during transit. Upon receipt the transmission of the weak, unique signal would be reactivated as part of the scanning of tag devices during the receiving process and be under the surveillance system at the new location. During the receiving process, the central surveillance system is notified to begin monitoring a received tag device.

The display control 44 creates the graphics and/or text images to be produced on the programmable displays in response to the microprocessor 32. A receptacle jack clamp and controller 46 can be activated to release the jack 22 from the clamp in the tag device so that the tag device can be removed from a piece of merchandise. The receptacle jack clamp and controller 46 are instructed by the microprocessor 32 when to release the jack. The microprocessor is programmed so that it will only instruct the receptacle jack clamp and controller to release the jack when a signal is received indicating that the piece of merchandise has been purchased. In the event a tag device becomes entirely disabled, a separate tag detacher device may be provided at the point of sale to assist in removing tag devices from purchased merchandise.

With the jack 22 in place, a signal may be sent through the connector 20. These may be electrical or optical signals depending on the material used in the connector 20. Alarm 48 is deactivated after the microprocessor 32 receives a signal indicating that the merchandise has been purchased. An open circuit detector is provided for indicating when the signals are not able to make it through the conductive loop because of some break. Thus, alarm 48 will sound if the connector 20 is severed or improperly detached. The alarm 48 may also be used to provide instructions to the microprocessor to stop communication with the surveillance system. Alternatively, to indicate the alarm condition, a radio frequency signal may be emitted. Thus, a surveillance system learns of the break in the connector 20 and can alert security personnel to the assigned location where the alarm has been activated. An RF sensor at an exit door may also trigger alarm 48 to emit an audible sound when detecting a tag device passing through.

Figure 3:
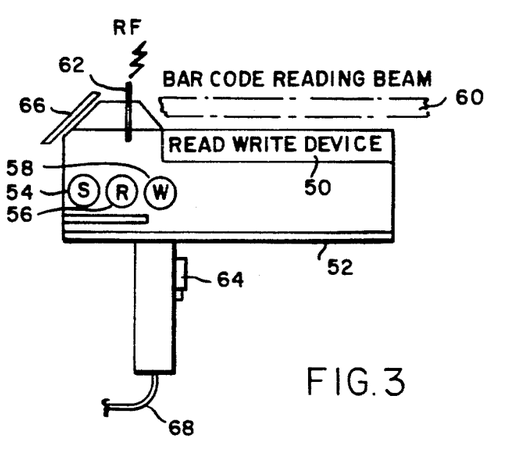
FIG. 3 is a side view of a read/write scanner of the present invention.

FIG. 3 is a side view of a hand-held read/write scanner device 50 to communicate with tag devices and computers. Similar devices are presently available for purchase from Symbol Technologies of Bohemia, N.Y. and Intermec of Everett, Wash. Such devices, however, do not incorporate the ability to engage in wireless communication with free-standing electronic tag devices. Present devices primarily scan bar codes from price labels and some transmit and receive RF communications from a host computer. Such devices are well known in the art. The read/write scanner 50 of the present invention advantageously reads bar codes on display panels and transmits or receives data to or from a self-contained, reusable electronic label and security device.

Read/write scanner 50 consists of a frame 52 housing apparatus for wireless communication and bar code scanning. To activate bar code reading, the operator pushes button "S" 54 and pulls trigger 64 instructing bar code reading beams 60 to read bar codes imaged on a medium or printed on any substrate such as an employee identification card. To read RF signals from a tag device, the operator would push button "R" 56 and pull trigger 64 to initiate wireless reading through aerial 62. Button "W" 58 is pushed and trigger 64 is pulled to transmit data to a tag device through the aerial 62. Data which has been read or is to be transmitted may be displayed on a display/keyboard panel 66. Cable 68 connects the read/write scanner to a supervising computer system which controls and directs the activities of the operator.

Figure 4:
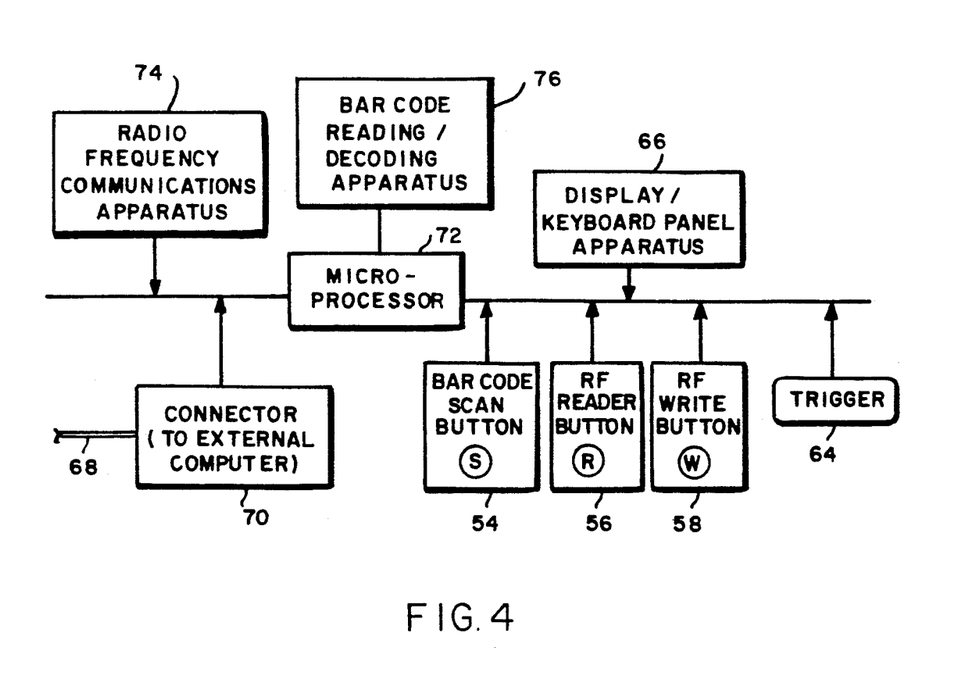
FIG. 4 is a schematic block diagram of the electronics of the read/write scanner of the present invention.

FIG. 4 is a schematic block diagram of the components of read/write scanner 50. Connector 70 receives and transmits data and instructions from the external supervising computer system via cable 68. The data and instructions are then processed by microprocessor 72 and distributed to the connecting functional apparatus. If, for example, the instructions were to transmit the selling price to a tag device attached to a specific piece of merchandise, the microprocessor would direct the display/keyboard apparatus to display this information on the display panel for the operator to visually verify. The operator may then push button "W" 58 and pull trigger 64 to transmit the pricing information to the specific tag device through the radio frequency communications apparatus 74. A second instruction to the operator may be to visually read the pricing information on the display panel 14 of the tag device to verify its accuracy as it relates to the merchandise to which it is attached. A further instruction may include such things as rereading the bar code displayed on a tag scanner with the read/write device. The operator would accomplish this by pushing button "R" 56, pulling trigger 64 and directing the bar code reading beams to the correct tag devices, and bar code reading/decoding apparatus 76 would transfer the data to microprocessor 72 for verification and/or processing. The data may then also be displayed by the display/keyboard panel 66 for visual verification by the operator.

Figures 5, 6:
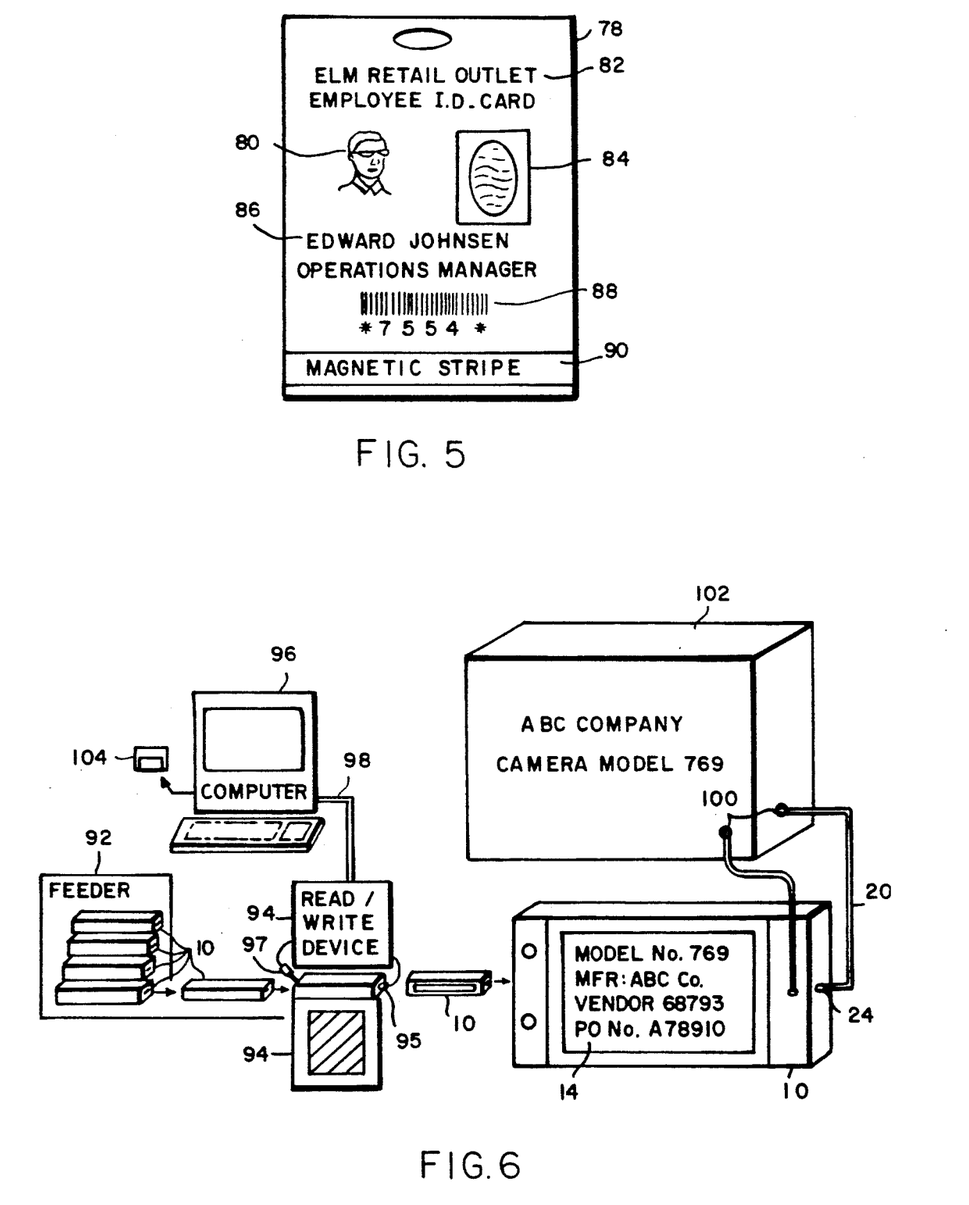
FIG. 5 is a front view of an employee identification card for use with the devices of the present invention.
FIG. 6 is a pictoral schematic diagram of a system for programming tag devices of the present invention.

The store's employees are each provided with an I.D. card as shown in FIG. 5. An employee I.D. card 78 contains employee information which may include their picture 80, the name of the employer 82, the employee's fingerprint 84, employee number represented as a bar code 88, a magnetic stripe 90 which contains pertinent data about the employee and the employee's printed name 86. Each employee creates his own personal identification code (PIC) which is stored in the master store computer system. Immediately prior to scanning the bar codes on a tag device or reading and/or transmitting data to a tag device, an operator is required to scan his employee identification card 78 and enter his PIC on the display/keyboard 66 of the read/write scanner 50 in order to proceed with the job function at hand. If a PIC is not entered, the computer system will prevent the employee from using a read/write scanner to read and/or alter the contents of a tag device. By including the requirement of keying in a PIC, one employee is prevented from using another employee's card inappropriately to "handle" merchandise. The data relating to the employee who did handle merchandise is recorded by the master store computer system.

Referring now to FIG. 6, a method for initially programming the tag devices 10 of the present invention is shown. The tag devices 10 are assembled into an automatic feeder 92 and then are fed one at a time into a read/write device 94. The read/write device 94 is under computer 96 control, linked by a cable 98. Computer 96 instructs the read/write device 94 to clear all the data in each tag device 10 once it is into position from the automatic feeder 92. The computer can then process and write the new data into each tag device 10 as may be required based upon the piece of merchandise 102 to which it will be attached. The read/write device 94 has a jack 95 which is inserted into receptacle 24 to supply and receive data to and from the tag devices 10, and a similar jack device 97 is provided to recharge the power source (not shown). Each tag device can be provided with information such as a product model number, manufacturer vendor number, serial number and purchase order number. Each tag device is then assigned a unique identification code and such code is recorded in the computer systems for future accounting and tracking of merchandise. The connector 20 on each tag device is inserted through security hole 100 in the merchandise or merchandise container 102 to which it corresponds. Display panel 14 identifies the merchandise 102 to which the tag device is attached. A transportable data file, floppy disk 104, is created containing identical information that is also contained in computer 96 and in the tag devices 10. The floppy disk 104 will normally accompany the merchandise to the destination and the identical data in computer 96 is transmitted via telephone modem to the purchaser's receiving facility warehouse computer and subsequently to the master store computer files. The product model number, manufacturer vendor number, serial number of the merchandise, purchase order number, etc., is maintained in the tag device until the merchandise has been fully processed through the store's receiving facility, and through all additional steps until purchased by a consumer. Once the tag device has been processed through the point-of-sale system, the tag device may be reprogrammed for attachment to a new article of merchandise.

The tag devices can be used advantageously as a security device for the articles of merchandise as they are transported from the manufacturer to the store. Upon receipt, the store can scan the bar codes on the tag devices to compare the data received in floppy disk 104 with the merchandise. Comparison is also made with the identical data previously received by telephone modem from computer 96 to be sure that all the merchandise is accounted for. This method immediately detects loss of merchandise between the manufacturer and the purchaser. In the event merchandise is received in the store's warehouse which does not have a tag device attached, the warehouse personnel may use the system described hereinabove to attach tags to the merchandise. During the receiving operation, a unique identification code is assigned into each tag device and recorded in the master store computer system with the description of the merchandise. A master file of the unique identification codes is maintained by the master store computer system indicating the merchandise to which each tag device is attached. Additional information as deemed necessary can also be recorded by the computer system, including which employee received it from which vendor, or attached the tag device to it, and the date and time of receipt, serial number, model, etc.

Figure 7:
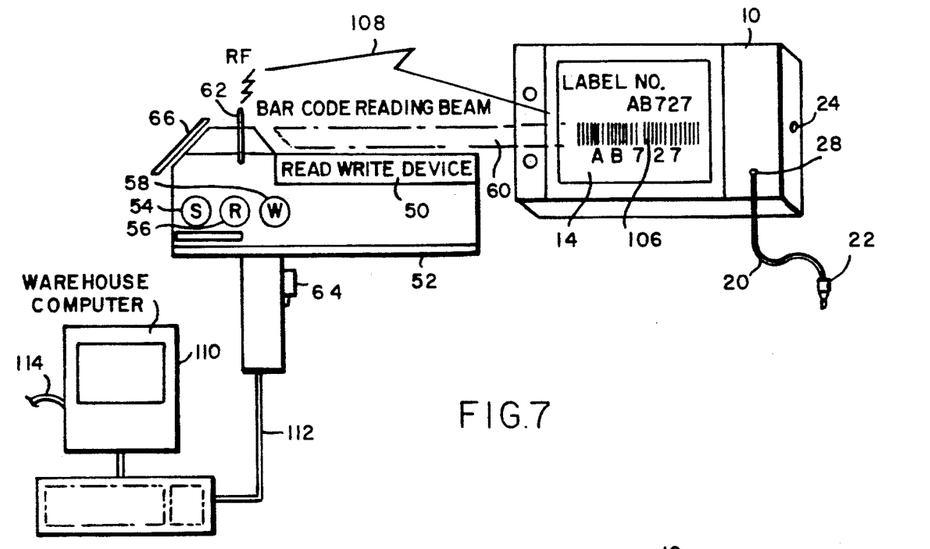
FIG. 7 is a side view of a read/write scanner connected to a computer and reading a tag device of the present invention.

FIG. 7 shows a hand held read/write scanner 50 reading a bar code 106 from a programmable display 14 of a tag device 10. The read/write scanner may also contain apparatus for reading the tag device through wireless communications 108. The hand held read/write scanner includes button "S" 54 to depress and a trigger 64 for activating the bar code reading beams 60 portion enabling the device to read the bar code 106 on the display panel of the tag device. By depressing button "R" 56 and pulling the trigger 64 a second time, the tag device will be read using wireless communications 108. The read/write scanner is connected to a warehouse computer 110 via a cable 112. Warehouse computer 110 may receive its data and instructions from the master store computer system via cable 114. By reading the unique bar code on the tag device or reading the tag device by wireless communication, the computer 110 can locate the master record file for that particular article of merchandise.

Purchased merchandise is first received and stocked by the store in its warehouse. It must be shipped at some time to a retail store to be sold to consumers. A store may issue a request to the warehouse for additional merchandise. The stock numbers of merchandise needed would be entered into the master store computer system. The master store computer system would transmit these shipping orders to the warehouse computer. A shipping request is created and an employee is assigned to pull the merchandise from stock. An employee scans his I.D. card 78 and the tag device 10 attached to each article of merchandise, and the read/write device 50 will transmit changes to the tag device 10 to reflect the new current status of the merchandise. For example, the destination store number can be transmitted to the tag device of the merchandise to be shipped and then displayed in human readable images. Thus, the employees are assisted in making sure that the merchandise gets on the appropriate truck for delivery to the correct store.

The revised data on the tag device will be used at the destination store to verify receipt of the merchandise. The tag device displays in human-readable form and in bar code form the store number, shipping order request number and the unique identification code identifying the particular attached merchandise. The master store computer file on that particular piece of merchandise will then be updated to reflect its movement and the employee who handled it.

A floppy disk of the contents of the shipment accompanies the merchandise to its destination. The data may also be transmitted to the destination computer via a modem. At the store receiving area, an employee can use the read/write scanner 50 to scan his personal employee I.D. card 78, and all the bar codes on the tag devices. This data is compared with the data previously received via modem and contained on the accompanying floppy disk. The comparisons done by the computer would also identify any missing merchandise and the employees who handled it. Discrepancies would be reported immediately to management by the computer system.

Figure 8:
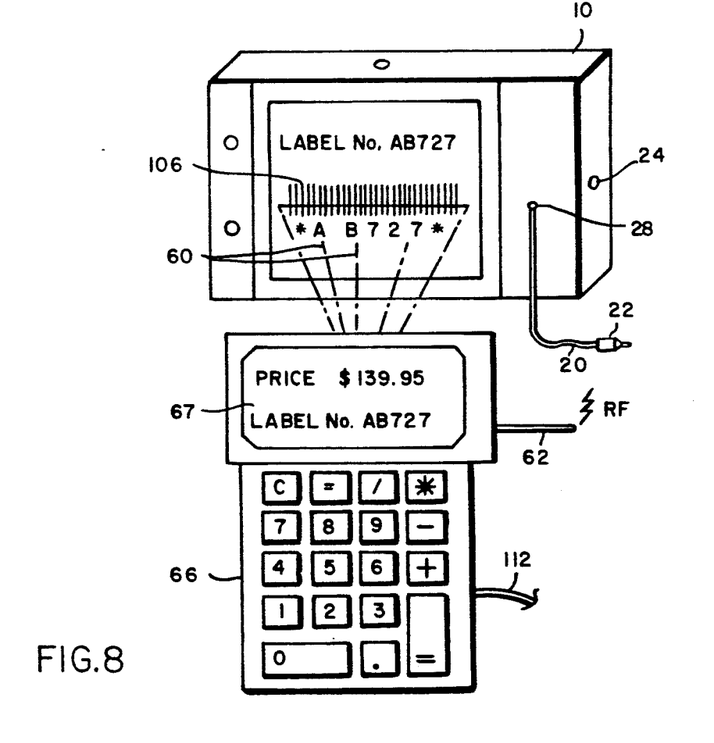
FIG. 8 is a back view of the keyboard/display panel of the read/write scanner of FIG. 7 of the present invention.

Located on the back of read/write device 50 of FIG. 7 is a display/keyboard 66 (back view) as shown in FIG. 8. The scanned bar code 106 on a tag device is transmitted to the warehouse computer 110 for verification. If the data from the tag device matches the data in the computer and the employee's identification has authorization, then the employee can instruct the computer to change the status of the tag device. Warehouse computer 110 provides the read/write scanner 50 with new data to be transmitted to the tag device 10 via the wireless communication system to replace the data presently displayed. Information which may be transmitted to the tag device from the read/write scanner at this point would include the correct place to store the merchandise and the retail price of merchandise. Wireless transmission of the data to the tag device may be accomplished by depressing button "W" 58 and pulling the trigger 64. This information can then be displayed in human-readable form on display panel 14 of the tag device. The location information will instruct employees where to place the merchandise. The tag device 10 is used in the store to display price information to inform consumers of the price of merchandise to which it is attached. At least one side of the display on the tag device will continue to show the bar code which uniquely identifies the merchandise so that it can be read by a read/write scanner 50.

When pricing merchandise with equipment of the present invention, inventory accounting can also take place. Since each tag device has a unique identification code, a physical inventory count is being performed simultaneously as the retail price is assigned to the tag device. If the employee performing the pricing activity notices an incorrect price or other error in the data shown in display panel 67, he may enter corrected data on the keyboard portion and transmit it to the tag device. The corrected data and employee number will be recorded into the warehouse computer 110 and subsequently transmitted to the master store computer.

When the merchandise is brought into a store from the warehouse, the shelf or rack location is displayed on the tag device 10 so that employees can properly store the merchandise. The unique identification codes of each of the new items are provided to the master store computer so that the central surveillance system can initiate monitoring the new tag devices. The central surveillance system would instruct the tag devices as to how often to expect communications from the retail surveillance system so that if a tag device fails to receive a communication from the retail surveillance system within an adequate time delay, then the tag device alarm 48 will be activated. This monitoring capability provides protection against merchandise being removed from the store. If the tag device 10 is moved outside the retail surveillance system, the alarm 48 will go off.

Figure 9:
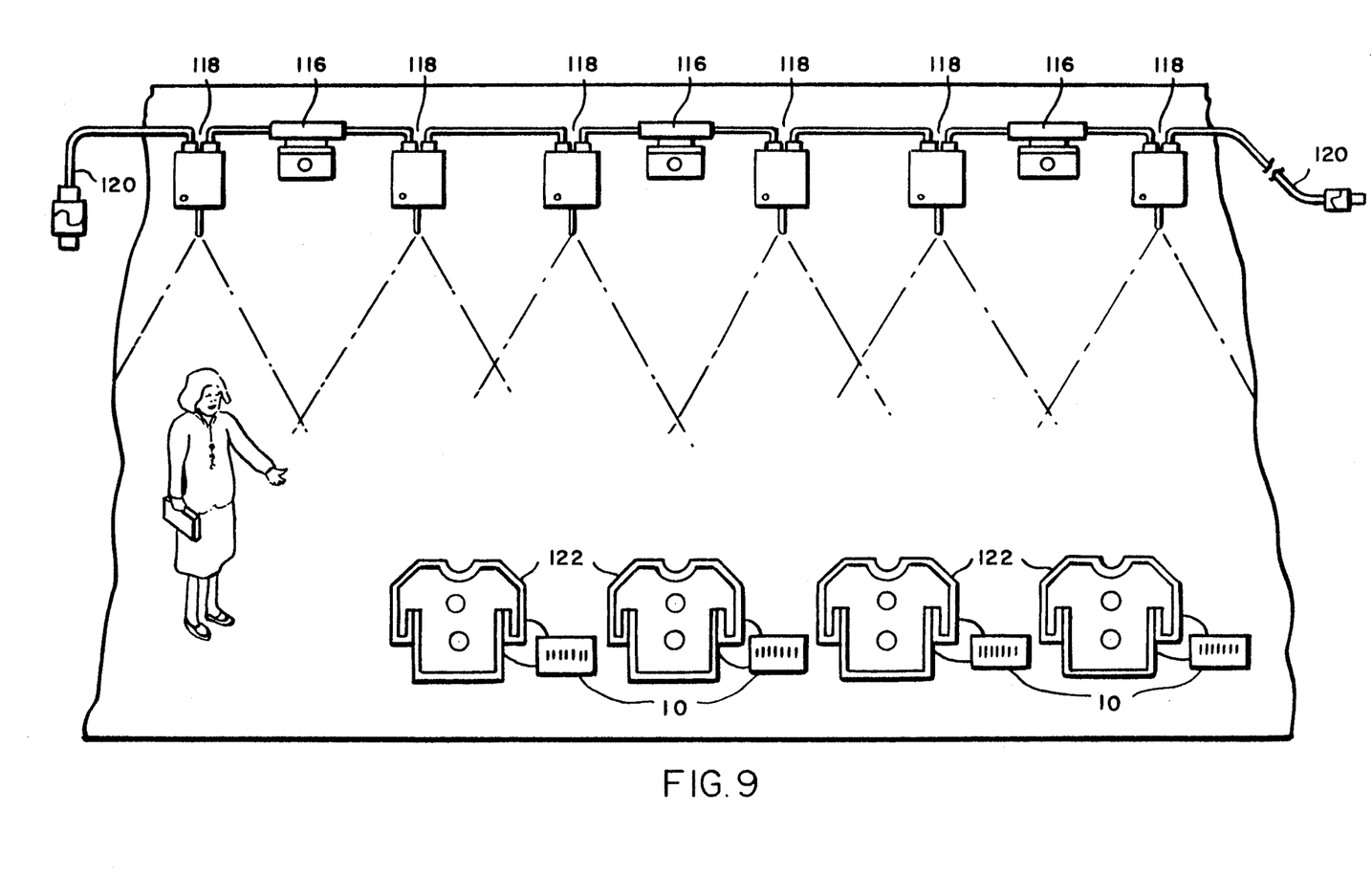
FIG. 9 is an elevational schematic of merchandise for sale in an area under a surveillance system.

Referring now to FIG. 9, overhead stationary read/write devices 118 connected to the central surveillance system's computer via cable 120 are shown in position over a retail selling floor constituting a retail surveillance system with video cameras 116 strategically positioned. A rack of blouses 122 is illustrated, each having an attached tag device 10. The overhead stationary read/write devices 118 communicate with the tag devices 10 attached to the blouses using radio frequency communication. The overhead stationary read/write devices 118 are similar to those described in FIG. 3, and have the same functionality except they will not read bar codes. Each tag device may receive a signal from an overhead stationary read/write device 118 containing its unique identification code and will acknowledge its presence by responding to the inquiry. The acknowledgement response may also include the unique identification code. A grid map of the assigned selling location of merchandise is maintained in the central surveillance system's computer (not shown). Each tag device attached to merchandise within an area is assigned to a location within the grid map of the area under surveillance. Each tag device within an assigned location is positioned within the grid map so that if communication with a tag device is lost, security personnel are directed to the correct location and the video cameras are activated. In the event a connector 20 is severed or detached, the tag device can transmit a distress signal to the overhead stationary read/write device 118. In the event a tag device is "totally" destroyed and cannot emit the distress signal, the overhead stationary read/write device 118 will discover the missing tag device as part of the constant monitoring procedures it performs on all tag devices. The retail surveillance system would immediately alert security personnel to the assigned location of the merchandise attached to the tag device via the grid map. If tag device 10 is removed from a blouse 122 by breaking its connector 20, alarm 48 will be activated. If a tag device and attached merchandise are removed from their assigned location, for example, a blouse 122 and attached tag device are transported to another location in the store as the consumer continues to shop, the retail surveillance system may track movement of the tag device from place to place, transferring monitoring control to other interconnected surveillance systems within the store and inform the central surveillance system of the movement. Warehousing areas are protected in the same fashion.

Upon occasion, the store will offer certain merchandise at discounted or "sale" prices. The tag devices on each piece of merchandise can be updated from the master store computer system through the retail surveillance system, transmitting the "sale" prices by wireless communication to each tag device. It could also instruct each tag device to flash its LED 16 to notify consumers that this piece of merchandise is "on sale".

Figure 10:
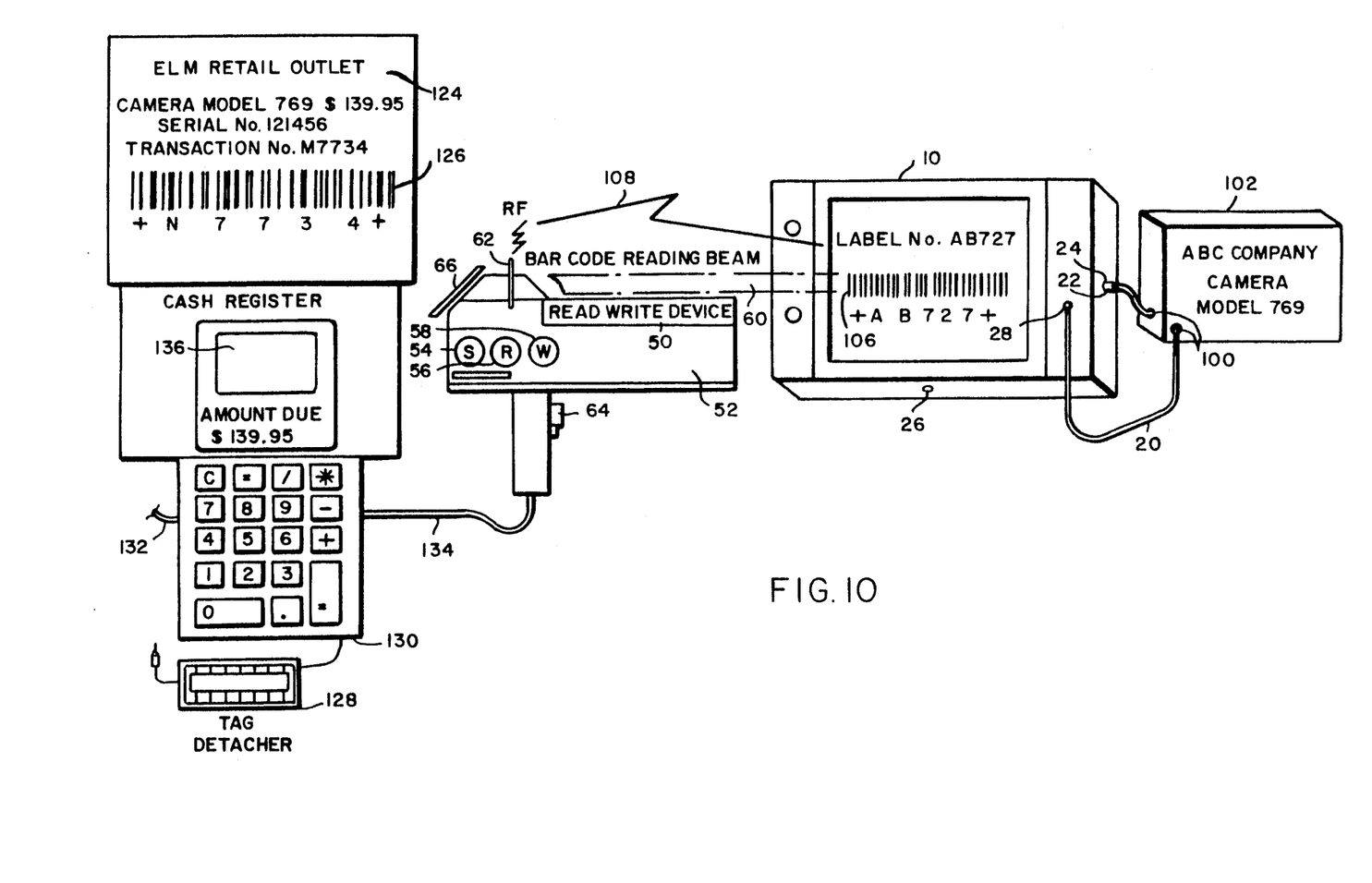
FIG. 10 is an illustration of a point-of-sale apparatus for use with the devices of the present invention.

FIG. 10 shows a point-of-sale cash register system consisting of a cash register 130 and a read/write scanner 50 attached to the cash register by a cable 134. The read/write scanner 50 reads the bar code 106 on tag device 10 and transfers the data to the cash register 130. Alternatively, wireless communication 108 can be used to read the tag device. The cash register 130 looks up the unique identification code for that merchandise in its memory and displays the price on its own display panel 136. If the unique identification code read from the tag device attached to the merchandise is a valid code and the merchandise is being purchased by a consumer, the read/write scanner 50 transmits a sold signal via wireless communication 108 to instruct the microprocessor in the tag device to release the clamp which holds the jack 22 of connector 20, thus allowing connector 20 to be removed from the merchandise 102.

Alternatively, a tag detacher device 128 may be used to release connector 20 of a disabled tag device. The tag detacher device 128 is under the supervision of the cash register to which it is attached. From time to time a tag device 10 may become disabled. A controlled method of detaching a tag device from merchandise is desirable for this eventuality. The tag detacher device includes a jack which may be plugged into receptacle 26 of a disabled tag device. The jack is connected to a battery charger within the tag detacher device. In the event a tag device becomes disabled or is unreadable, instructions are provided to the tag detacher device 128 by a cash register system or other authorized computer system. First an attempt at recharging the tag device is made. If successful, the tag device can then be processed in the normal way. If the problem in the tag device cannot be repaired in this manner, the tag detacher device 128 can remove the tag device from the merchandise. The master store computer system has adequate controls which identify the employee performing the sale and records all relevant data. If a valid authorized sale of the merchandise has been made, the cash register will enable the tag detacher device to use its unclamping mechanism to detach the tag device. Detaching disabled tag devices at the point of sale requires special authorization from the cash register system if a purchase is not being made.

The sale is recorded by the cash register and cannot be voided out after the release of the clamp without authorization from a store manager. Releasing the clamp on a normally-functioning tag device deactivates the alarm 48 and causes the tag device to stop sending out signals. The surveillance systems are also instructed to stop monitoring that particular uniquely-encoded tag device.

An accurate record of the sale is transmitted via cable 132 to the master store computer by the cash register system, as well as being printed on sales slip 124. By providing the sales slip 124 with all pertinent data reflected by a unique bar code 126 representing the transaction, a "returned" piece of merchandise can be looked up in the master store computer system by scanning the bar code on the sales slip for verification and validation. For example, scanning bar code 126 on sales slip 124 recalls the details of the transaction from the master store computer system and could display the serial number of an article being returned.

Figure 11:
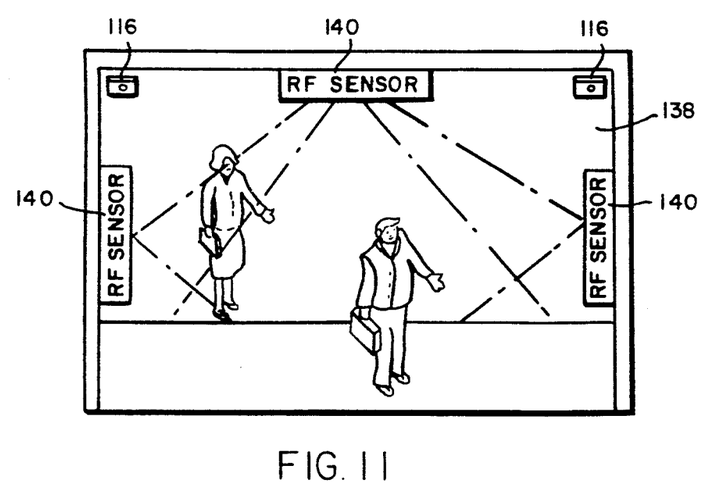
FIG. 11 is an elevational view of a doorway protected by sensors and cameras.

Referring now to FIG. 11, a door opening 138 is shown protected by RF sensors 140 and surveyed by video cameras 116. In the embodiment shown, there are RF sensors on either side of the doorway and one overhead. Such protection can be installed at the doorways of a warehouse or a retail store. Each RF sensor 140 is a radio frequency reader which monitors the area by scanning the physical opening and also has the ability to transmit a unique RF signal to tag devices. If the RF sensors 140 detect the weak, unique RF signals emitted by all tag devices 10 when they pass through the doorway surveillance system an alarm is sounded at the doorway and verifies their status with the central surveillance system. Security personnel can be notified and video cameras activated. Once the tag device is out of the range of the store surveillance system, alarm 48 will sound within the tag device.

Figure 12:
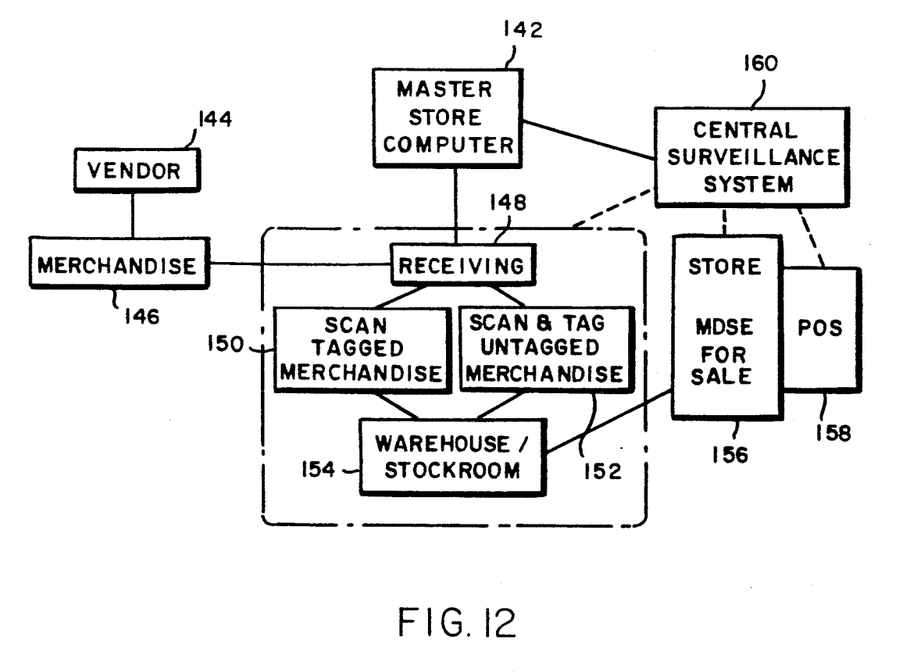
FIG. 12 is a schematic flowchart of an application using devices of the present invention.

FIG. 12 shows a typical application utilizing devices of the present invention. Master store computer 142 controls the normal accounting functions of a store, such as inventory control, purchasing, receiving, payroll, distribution of merchandise to individual stores, etc. Master store computer 142 is networked with other off-site computers within the store chain, supervising and controlling their activities. The master store computer controls access to the personal identification codes of employees as described in FIG. 5 and provides authorization for data to be transmitted to tag devices.

Central surveillance system 160 is controlled by master store computer 142. The central surveillance system computer supervises the overhead read/write devices in warehouse and selling floor areas as described in FIG. 9 and doorway surveillance activities as described in FIG. 11.

The master store computer 142 may issue a purchase order to vendor 144 for merchandise 146. If a vendor has the ability to program and attach tag devices to merchandise 146 as described in FIG. 6, the vendor then ships the tagged merchandise 150 to a receiving area 148, as described in FIG. 7. Alternatively, if a vendor does not have the ability to program and attach tag devices, store employees will apply tag devices to the untagged merchandise 152 upon receipt. The same procedure is followed in the warehouse/stockroom 154 as described in FIG. 6.

Merchandise 146 is distributed to store 156 for sale to consumers. Central surveillance system 160 continues to monitor all merchandise having a tag device attached. After merchandise is purchased by a consumer at the point of sale 158 as described in FIG. 10, the removed tag device can be reused.

It should be understood that the present disclosure is for the purpose of illustration only and does not include all modifications or improvements which may fall within the scope of the appended claims.

I claim:

1. A security and inventory control device comprising:
    a tag device;
    means for attaching said tag device to a piece of merchandise;
    identification means on said tag device for identifying the piece of merchandise;
    means, located on said tag device, for sounding an alarm if said tag device is removed from the piece of merchandise;
    means, located on said tag device, for receiving a sold signal, said sold signal being issued when said identification means has been read to purchase said piece of merchandise;
    means, in communication with said alarm sounding means and said receiving means, for disarming said alarm sounding means after the sold signal has been received; and
    means, coupled to said receiving means, for releasing said means for attaching after the sold signal has been received so that said tag device may be removed from said piece of merchandise.

2. The security and inventory control device of claim 1 wherein said identification means comprises a programmable display.

3. The security and inventory control device of claim 2 further comprising a manual control on said tag device which causes information displayed by said programmable display to change.

4. The security and inventory control device of claim 2 wherein said programmable display has sufficient resolution to display a machine-readable UPC bar code.

5. The security and inventory control device of claim 2 wherein said receiving means comprises a wireless RF receiver.

6. The security and inventory control device of claim 5 further comprising processor means connected to said receiver for controlling said programmable display in response to signals received by said receiver.

7. The security and inventory control device of claim 1 wherein said identification means comprises a bar code.

8. The security and inventory control device of claim 1 wherein said means for attaching comprises a conductive loop having two attachments to said tag device for attaching said tag device to said piece of merchandise and wherein said alarm sounding means is responsive to a break in a circuit formed by said loop.

9. A price tag security device comprising:
    a housing;
    a programmable display mounted on said housing;
    processor means coupled to said programmable display;
    means for attaching said housing to a piece of merchandise;
    means, coupled to said processor means, for detecting detachment of said housing from said piece of merchandise;
    communication means, coupled to said processor means, for receiving wireless communications; and
    means, coupled to said processor means, for releasing said attaching means in response to receipt of a signal indicating said piece of merchandise has been purchased and said programmable display has been scanned.

10. The price tag security device of claim 9 wherein said attaching means comprises a conductive loop and wherein said detecting means comprises means for detecting an open circuit through said conductive loop.

11. The price tag security device of claim 9 wherein said programmable display has sufficient resolution to display a machine-readable UPC bar code.

12. The price tag security device of claim 9 wherein said communication means receives price information which said processor means causes to be displayed on said programmable display.

13. The price tag security device of claim 9 further comprising a button on said tag device for changing information displayed on said programmable display.

14. The price tag security device of claim 9 further comprising a light on said tag device and means for repeatedly flashing said light.

15. The price tag security device of claim 9 further comprising an alarm which sounds in response to detection of detachment by said detecting means.

16. The price tag security device of claim 15 wherein said alarm sounds when removed from a surveillance area.

17. The price tag security device of claim 15 further comprising means for deactivating said alarm after said programmable display has been scanned upon purchase of said piece of merchandise.

18. A security and tracking device comprising:
    a tag device;
    communication means on said tag device for transmitting and receiving wireless communications;
    processor means coupled to said communication means;
    means for attaching said tag device to a piece of merchandise;
    means, coupled to said processor means, for detecting detachment of said tag device from said piece of merchandise; and means, coupled to said processor means, for releasing said attaching means, wherein said processor means operates said releasing means in response to a signal received by said communication means, said signal indicating that said piece of merchandise has been purchased.

19. The security and tracking device of claim 18 wherein said attaching means comprises a conductive loop and wherein said detecting means comprises means for detecting an open circuit through said conductive loop.

20. The security and tracking device of claim 18 further comprising an alarm which sounds in response to detection of detachment by said detecting means.

21. The security and tracking device of claim 20 wherein said alarm sounds when removed from a surveillance area.

22. The security and tracking device of claim 18 further comprising a programmable display on said tag device in communication with said processor means.

23. The security and tracking device of claim 22 wherein said programmable display has sufficient resolution to display a machine-readable UPC bar code.

24. The security and tracking device of claim 22 wherein said communication means receives price information which said processor means causes to be displayed on said programmable display.

25. The security and tracking device of claim 22 further comprising a light on said tag device and means for repeatedly flashing said light.

26. The security and tracking device of claim 22 further comprising a manual control on said tag device which causes information displayed by said programmable display to change.

27. A reusable product label comprising:
 a programmable display mounted on a tag device;
 communication means, in said tag device, for receiving wireless communications;
 processor means coupled to said communication means;
 means for attaching said tag device to a product;
 said programmable display including means for displaying a machine-readable bar code corresponding to the product; and
 means, coupled to said processor means, for releasing said attaching means wherein said processor means operates said releasing means in response to a sold signal received by said communication means, said sold signal being indicative that the bar code on said programmable display has been read to purchase said product.

28. The reusable product label of claim 27 wherein said programmable display has sufficient resolution to display a machine-readable UPC bar code.

29. The reusable product label of claim 27 further comprising a manual control for changing the image on the display.

30. The reusable product label of claim 27 further comprising an alarm responsive to an electronic circuit formed by said attaching means so that said alarm is activated when said circuit is broken.

31. The reusable product label of claim 30 wherein said alarm is deactivated when said sold signal is received by said communication means.

32. The reusable product label of claim 27 further including a light source on said tag device and means for flashing said light source.

33. A protection method for securely handling merchandise comprising the steps of:
 attaching an electronic label to a piece of merchandise;
 programming a unique identification code for said piece of merchandise into said electronic label;
 addressing said electronic label with an employee identification code for an employee receiving said merchandise;
 communicating with said label to give said label a price to display for said piece of merchandise if said employee identification code has authority to do so;
 setting off an alarm on said label if said label is detached from said piece of merchandise before purchase;
 reading said electronic label to register a purchase of said piece of merchandise;
 issuing a sold signal to said electronic label upon said reading of said electronic label;
 receiving said sold signal in said electronic label;
 disarming said alarm after receiving said sold signal; and
 said electronic label automatically releasing its attachment to said piece of merchandise after receiving said sold signal.

34. A method of inventory control comprising the steps of:
 writing a unique identification code into a programmable, processor-controlled tag device;
 attaching said tag device to a piece of merchandise;
 inputting an employee identification code into a read/write scanner;
 reading the unique identification code from said programmable, processor-controlled tag device using the read/write scanner; and
 writing a retail price into said programmable, processor-controlled tag device using the read/write scanner upon authorization of said employee identification code;
 reading said programmable, processor-controlled tag device at a point-of-sale device;
 issuing a sold signal to said programmable, processor-controlled tag device after said step of reading; and
 said tag device automatically releasing its attachment to said piece of merchandise in response to receiving said sold signal.

35. A security method for handling merchandise purchases comprising the steps of:
 attaching a programmable, processor-controlled tag device to a piece of merchandise;
 programming a unique identification code for said piece of merchandise into said tag device;
 setting off an alarm on said tag device if said tag device is removed from said piece of merchandise before purchase;
 reading the identification code off said tag device to register a purchase of said piece of merchandise;
 transmitting a sold signal upon said reading of said tag device;
 receiving the sold signal in said tag device;
 disarming said alarm after receiving the sold signal; and
 said tag device automatically releasing its attachment to said piece of merchandise in response to receiving the sold signal.

* * * * *